UNITED STATES PATENT OFFICE.

PAUL MECKE, OF STETTIN, GERMANY.

METHOD OF MAKING CEMENT, MORTAR, AND CONCRETE WATER-TIGHT.

No. 929,152.   Specification of Letters Patent.   Patented July 27, 1909.

Application filed December 28, 1908. Serial No. 469,706.

*To all whom it may concern:*

Be it known that I, PAUL MECKE, a subject of the German Emperor, and resident of Stettin, Germany, have invented certain new and useful Improvements in Methods of Making Cement, Mortar, and Concrete Water-Tight, of which the following is a specification.

It is already known to tighten cement by the addition of stearates of lime and aluminium in pulverized form or by soap solutions.

The improved method consists in that first a pulp which is freshly made by shaking quicklime is mixed with a solution of oleate of ammonia. The pulp produced which consists of oleate of lime and large quantities of slaked lime is then transposed by a solution of sulfate of aluminium. Hereby from the salts: aluminate of lime, oleate of lime, oleate of aluminium, slaked lime (and gypsum), a complicated compound is obtained which is substantially distinct as to its chemical and physical conditions, from a mixture of said salts and from these salts themselves. Thus it is not immaterial in which succession the single ingredients are mixed. For instance, if to the lime pulp first the sulfate of aluminium and then the oleate of ammonia are added, another useless substance is obtained. Upon chemical principles it must be assumed that by the large surplus of slaked lime only oleate of lime or—as sulfate of aluminium is employed in a surplus relatively to the oleic-acid—only oleate of aluminium beside aluminate of lime and slaked lime would be produced. The chemical test shows, however, that by absolute ether (and also by benzol) from the dried mass, beside organic lime, also small quantities of salts of aluminium are unbound. These must be organic modifications, as the inorganic compounds of aluminium in question do not dissolve in ether. Further it could not be foreseen that the compounds produced would form themselves in such an extraordinarily fine distribution as this is the case, as the oleate of aluminium and lime do generally separate themselves in large flocks. Also, as to the degree of solubility in absolute ether of the organic compounds contained in the new preparation, a difference to the basic oleate of lime is stated by conforming experiments in that from the latter only 19% of the whole (bound) oleic acid, and from the dried preparation 39%, are unbound in ether. Much more essential are, however, the differences between the new preparation and the basic oleate of lime as to the physical conditions, especially as to the water rejecting power. If by drying the two preparations a powder is produced and mingled with boiling water, the basic oleate or stearate of lime (as is mentioned in the U. S. specification No. 851247) as well as the stearate of aluminium is wetted by the water and sinks down, while the powder made from the new preparation swims—even after long boiling—in dry condition on the level of the water. This is not obtained with other (also basic) stearates, even if their contents of sebacic acid amounts to the manifold of that in my preparation. Particularly from this quality—viz. the water rejecting power—results the advantage of the new preparation over others.

Oleates of lime and of aluminium contain more than 90% of oleic acid, whereas my new preparation has, with greater capacity, only 2% of oleic acid, which means that the concrete or mortar mixed therewith is changed in its other qualities, especially as to its compactness, to a very small degree only.

The new preparation does not represent, as those hitherto known, a powder but a very soft hydrous pulp, which allows an easy mixing with the concrete and a very fine uniform distribution. An employment of the preparation in the form of a powder is even impossible, as the latter could after drying not more be wetted by water and therefore not be mixed with the wet mortar, which can be done with the hitherto known preparations.

Practical experiments which have been made with the preparation during the last year, show that concrete slabs of 1 cm. thickness already are by the addition impermeable even at a pressure of about 3 meters and more water column.

Mortar with the improved addition perfectly stops the capillary attraction between two bricks. In the same way the hitherto known methods were tested but, in spite of substantially higher contents of sebacic acid, not even approximately the same degree of impermeability against water was obtained.

It must be noted that the new method is, on account of the small contents of sebacic acid in the preparation, much cheaper than all the hitherto known methods.

Having fully described my invention, what I claim and desire to secure by Letters Patent is:—

Method of making watertight concrete and mortar, consisting in adding to the cement or lime mixture a pulp produced by the transposition of basic oleate of lime with sulfate of aluminium.

In testimony whereof I have hereunto set my hand in the presence of two subscribing witnesses.

PAUL MECKE.

Witnesses:
 ALBERT KRAFT,
 O. HARDER.